US008899966B2

(12) United States Patent
Okamoto

(10) Patent No.: US 8,899,966 B2
(45) Date of Patent: Dec. 2, 2014

(54) MULTILAYER MOLDING APPARATUS AND MULTILAYER MOLDING METHOD

(75) Inventor: Akio Okamoto, Yamaguchi (JP)

(73) Assignee: Ube Machinery Corporation, Ltd. (JP)

( * ) Notice: Subject to any disclaimer, the term of this patent is extended or adjusted under 35 U.S.C. 154(b) by 282 days.

(21) Appl. No.: 13/264,330

(22) PCT Filed: May 21, 2010

(86) PCT No.: PCT/JP2010/058649
§ 371 (c)(1),
(2), (4) Date: Nov. 14, 2011

(87) PCT Pub. No.: WO2010/137531
PCT Pub. Date: Dec. 2, 2010

(65) Prior Publication Data
US 2012/0049408 A1    Mar. 1, 2012

(30) Foreign Application Priority Data
May 28, 2009   (JP) .................................. 2009-128509

(51) Int. Cl.
*B29C 45/04*   (2006.01)
*B29C 45/16*   (2006.01)

(52) U.S. Cl.
CPC .......... *B29C 45/045* (2013.01); *B29C 45/1675* (2013.01); *B29C 2045/167* (2013.01)
USPC ...................................................... 425/576

(58) Field of Classification Search
CPC .. B29C 45/04; B29C 45/045; B29C 45/0441; B29C 45/10
USPC ....................................................... 425/576
See application file for complete search history.

(56) References Cited

U.S. PATENT DOCUMENTS

| | | | |
|---|---|---|---|
| 5,773,049 A | * | 6/1998 | Kashiwa et al. ............... 425/572 |
| 5,843,496 A | * | 12/1998 | Ito et al. ......................... 425/589 |
| 2006/0076713 A1 | * | 4/2006 | Rossanese ................. 264/328.1 |
| 2006/0099395 A1 | * | 5/2006 | Cowelchuk et al. .......... 264/402 |

FOREIGN PATENT DOCUMENTS

| | | |
|---|---|---|
| JP | 62-060618 | 3/1987 |
| JP | 07-195413 | 8/1995 |
| JP | 2006-110991 | 4/2006 |
| JP | 2008-012784 | 1/2008 |
| JP | 2009-023237 | 2/2009 |
| JP | 2009-101670 | 5/2009 |
| JP | 2009-255464 | 11/2009 |
| KR | 100509378 | 8/2005 |
| KR | 2007/0122086 | 12/2007 |
| WO | 89/01860 | 3/1989 |

* cited by examiner

*Primary Examiner* — Yogendra Gupta
*Assistant Examiner* — Alison Hindenlang
(74) *Attorney, Agent, or Firm* — Clark Hill PLC

(57) ABSTRACT

A multilayer molded product is formed by a multilayer molding apparatus including: a plurality of injection units on the part of a fixed platen; a moving platen caused to open and close the molds by a mold clamping unit; and a rotary platen mounted with different mold cavities on its surfaces facing the fixed platen and the moving platen respectively and having a mechanism enabling to move between the fixed platen and the moving platen in a mold opening/closing direction in conjunction with a mold opening/closing operation, stop at an arbitrary position, and rotate. The multilayer molded product is formed according to a multilayer molding method of switching the cavity to be formed by a mold core mounted on the fixed platen and a mold cavity mounted on the rotary platen by rotating the rotary platen, and performing injection-filling into the respective cavities from the plurality of injection units in accordance with preset injection patterns.

9 Claims, 6 Drawing Sheets

MULTILAYER MOLDING APPARATUS AND MULTILAYER MOLDING METHOD

RELATED/PRIORITY APPLICATION

This application is a National Phase filing regarding International Application No. PCT/JP2010/058649, filed on May 21, 2010, which relies upon Japanese Application No 2009-128509, filed on May 28, 2009 for priority.

TECHNICAL FIELD

The present invention relates to a multilayer molding apparatus and a multilayer molding method used for forming a multilayer molded product in which a plurality of materials or a plurality of colors of resins are stacked.

BACKGROUND ART

A conventionally-known multilayer molding apparatus used for forming a multilayer molded product in which plural materials or plural colors of resins are stacked includes: a fixed platen; a moving platen free to move toward and away from the fixed platen in a mold opening/closing direction; a rotary platen provided between the fixed platen and the moving platen to be movable in the mold opening/closing direction and rotatable; and two injection machines facing the fixed platen and the moving platen respectively. Male molds of the same shape are mounted on the surfaces of the rotary platen facing the moving platen and the fixed platen respectively, and female molds to be combined with the male molds of the same shape on the rotary platen to form cavities of different shapes are mounted on the fixed platen and the moving platen respectively. (See Patent Document 1)

Known another multilayer molding apparatus includes: a fixed mold having two pairs of mold cavities having different shapes; a fixed platen mounted with the fixed mold in a horizontal direction; two injection machines provided in parallel with the apparatus's longer direction and capable of performing injection-filling into the respective mold cavities of the fixed mold; a moving mold having a mold core to be combined with the two pairs of mold cavities of the fixed mold having different shapes to form different cavities; a mold holder for guiding the moving mold by a displacing cylinder such that the moving mold slides in a horizontal direction perpendicular to the mold opening/closing direction; and a moving platen mounted with the mold holder and free to move toward and away from the fixed platen in the mold opening/closing direction. (See Patent Document 2)

CONVENTIONAL ART DOCUMENT

Patent Document

Patent Document 1: JPS62-60618A
Patent Document 2: WO89/01860

DISCLOSURE OF INVENTION

Problem to be Solved by the Invention

However, since the multilayer molding apparatus of Patent Document 1 has the moving platen mounted with a female mold and an injection machine, there is a problem that the weight on the part of the moving platen becomes heavy and the preciseness of the moving operation of the moving platen in the mold opening/closing direction becomes insufficient.

The multilayer molding apparatus of Patent Document 2 is configured such that the moving mold is guided by the mold holder of the moving platen to slide in the horizontal direction within the total width of the moving platen, and the fixed mold mounted on the fixed platen has the plurality of horizontally-arranged mold cavities that are to be touched with the moving mold. Therefore, there is a problem that the size of the molds is small relative to the whole apparatus, and the whole apparatus has to be upsized in order to form a multilayer molded product having approximately the same size as a multilayer molded product that can be formed by the multilayer molding apparatus of Patent Document 1. Such apparatus upsizing leads to weight increase, and to a problem that the preciseness of a moving operation in the mold opening/closing direction when clamping and opening the molds is reduced.

Hence, the present invention aims for providing a multilayer molding apparatus and a multilayer molding method with an improved preciseness in the moving operation in the mold opening/closing direction.

Means for Solving the Problem

To achieve the above object, according to one aspect of the present invention, a multilayer molding apparatus includes: a fixed platen mounted with a mold core; a moving platen mounted with a dummy plate on its surface facing the mold core, and movable with respect to the fixed platen in a mold opening/closing direction; a rotary platen provided between the fixed platen and the moving platen, movable with respect to the fixed platen and the moving platen in the mold opening/closing direction, rotatable about an axis extending perpendicular to the mold opening/closing direction, having at least a surface facing the mold core at a first position of rotation and a surface facing the mold core at a second position of rotation, and mounted with a first mold cavity on the surface facing the mold core at the first position of rotation and with a second mold cavity on the surface facing the mold core at the second position of rotation; a first injection unit provided on the part of the fixed platen connectably to the mold core, and configured to injection-fill a melt resin in a first cavity formed when the mold core and the first mold cavity are clamped; a second injection unit provided on the part of the fixed platen connectably to the mold core, and configured to injection-fill a melt resin in a second cavity formed when the mold core and the second mold cavity are clamped; and a mold clamping unit configured to move the moving platen with respect to the fixed platen in the mold opening/closing direction.

In one multilayer molding apparatus according to the present invention, the rotary platen and the moving platen may be simultaneously movable in the mold opening/closing direction.

In one multilayer molding apparatus according to the present invention, the mold clamping unit may be a toggle-type mold clamping unit.

In one multilayer molding apparatus according to the present invention, the rotary platen and the second injection unit may be separate members that are attachable and detachable.

According to another aspect of the present invention, a multilayer molding apparatus includes: a fixed platen having a surface mountable with a mold core; a moving platen having a surface, which faces the surface of the fixed platen mountable with a mold core, mountable with a dummy plate, the moving platen being movable with respect to the fixed platen in a mold opening/closing direction; a rotary platen provided between the fixed platen and the moving platen, movable with respect to the fixed platen and the moving platen in the mold opening/closing direction, rotatable about an axis extending perpendicular to the mold opening/closing direction, having at least a surface facing the surface of the fixed platen mountable with a mold core at a first position of rotation and a surface facing the surface of the fixed platen mountable with a mold core at a second position of rotation, and mountable with mold cavities on these surfaces respectively; a first injection unit provided on the part of the fixed platen, and configured to injection-fill a melt resin in a first cavity formed between the surface of the fixed platen mountable with a mold core and the surface of the rotary platen facing the surface of the fixed platen mountable with a mold core at the first position of rotation; a second injection unit provided on the part of the fixed platen, and configured to injection-fill a melt resin in a second cavity formed between the surface of the fixed platen mountable with a mold core and the surface of the rotary platen facing the surface of the fixed platen mountable with a mold core at the second position of rotation; and a mold clamping unit configured to move the moving platen with respect to the fixed platen in the mold opening/closing direction.

A multilayer molding method according to the present invention is a multilayer molding method carried out by using a multilayer molding apparatus according to one aspect of the present invention, and includes: a first mold clamping step of clamping the mold core and the first mold cavity to form the first cavity; a first molding step of filling a melt resin in the first cavity from the first injection unit to form a first molded component; a rotating step of, after the first molding step, with the first molded component held on the mold core, rotating the rotary platen to make the second mold cavity face the mold core; a second mold clamping step of, after the rotating step, clamping the mold core and the second mold cavity to form the second cavity; and a second molding step of, after the second mold clamping step, filling a melt resin in the second cavity from the second injection unit to form a second molded component.

In the multilayer molding method according the present invention, the first molding step may include: a first injection filling step of filling a foamable melt resin in the first cavity from the first injection unit; and a slight mold opening step of after the first injection filling step, simultaneously opening the moving platen and the rotary platen slightly by a specified quantity such that the foamable melt resin filled in the first injection filling step expands in the first cavity.

In the multilayer molding method according to the present invention, the second molding step may include: a second injection filling step of filling a foamable melt resin in the second cavity from the second injection unit; and a slight mold opening step of, after the second injection filling step, simultaneously opening the moving platen and the rotary platen slightly by a specified quantity such that the foamable melt resin filled in the second injection filling step expands in the second cavity.

In the multilayer molding method according to the present invention, the first mold clamping step may include: a mold closing step of closing the moving platen and the rotary platen to a position at which the mold core and the first mold cavity are slightly gapped from each other by a specified quantity to form the first cavity; and an injection press step of clamping the mold core and the first mold cavity in conjunction with the first molding step or after the first molding step to compress the melt resin in the first cavity, and the first molding step may include a first injection filling step of, after the mold closing step, filling the melt resin in the first cavity from the first injection unit.

In the multilayer molding method according to the present invention, the second mold clamping step may include: a mold closing step of closing the moving platen and the rotary platen to a position at which the mold core and the second mold cavity are slightly gapped from each other by a specified quantity to form the second cavity; and an injection press step of clamping the mold core and the second mold cavity in conjunction with the second molding step or after the second molding step to compress the melt resin in the second cavity, and the second molding step may include a second injection filling step of, after the mold closing step, filling the melt resin in the second cavity from the second injection unit.

Effect of the Invention

As is clear from the above, according to the present invention, it is possible to provide a multilayer molding apparatus and a multilayer molding method with an improved preciseness in the moving operation in the mold opening/closing direction.

BEST MODE FOR CARRYING OUT THE INVENTION

Figure 1A:
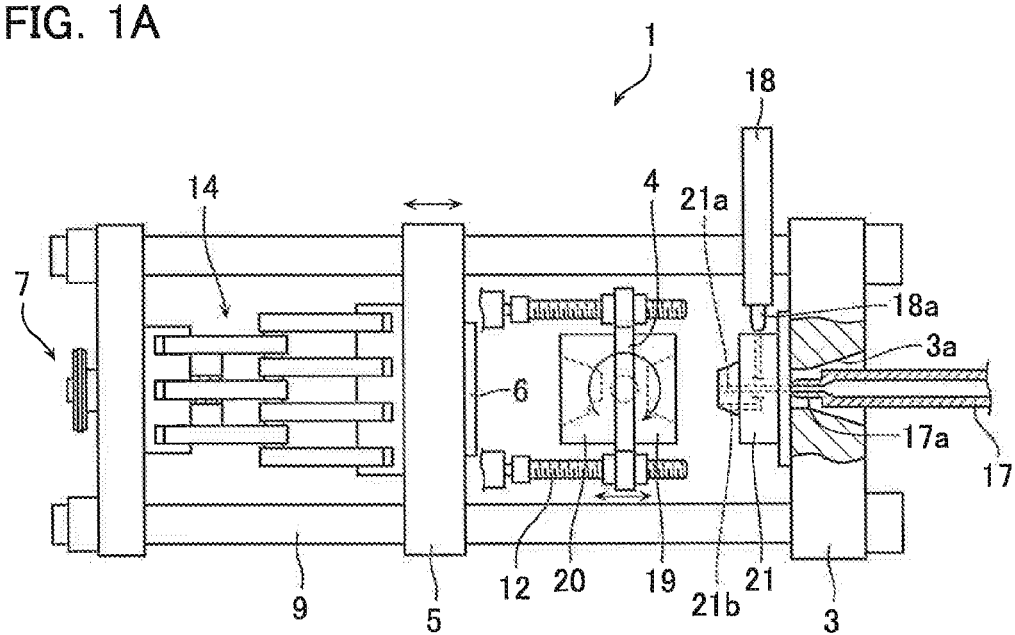
FIG. 1A is a plan view showing a schematic overall configuration of a multilayer molding apparatus according to one embodiment of the present invention.
Figure 1B:
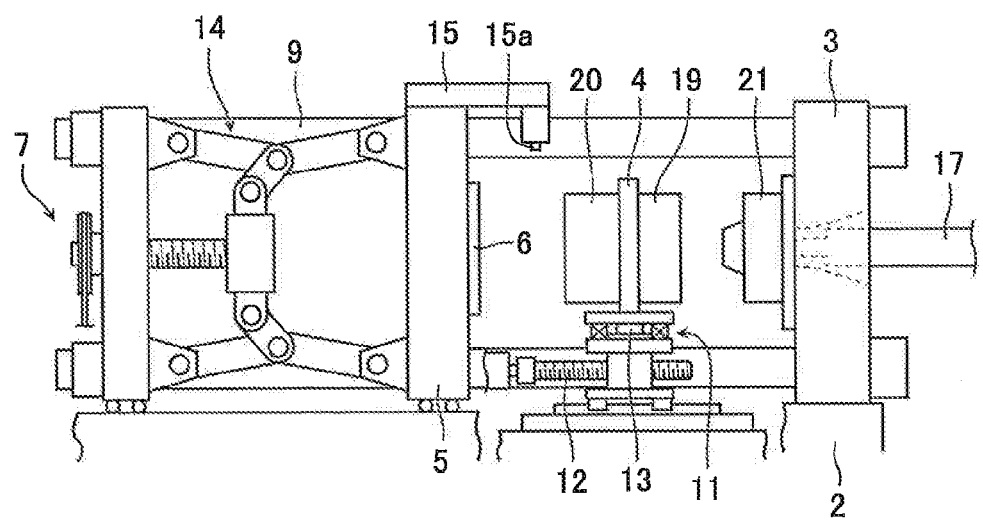
FIG. 1B is a front elevation showing a schematic overall configuration of the same multilayer molding apparatus.

Next, the best mode for carrying out the present invention will be explained in detail with reference to the attached drawings. First, the configuration of a multilayer molding apparatus 1 according to the present embodiment will be explained with reference to FIGS. 1A and 1B. FIG. 1A is a partially omitted plan view of the multilayer molding apparatus 1 according to the present embodiment. FIG. 1B is a partially omitted front elevation of the multilayer molding apparatus 1.

As shown in FIG. 1A and FIG. 1B, the multilayer molding apparatus 1 includes: a fixed platen 3 fixed on a bed 2; a moving platen 5 movable with respect to the fixed platen 3 in a mold opening/closing direction; a rotary platen 4 provided between the fixed platen 3 and the moving platen 5 to be movable in the mold opening/closing direction and rotatable; a first injection unit 17 and a second injection unit 18 both provided on the part of the fixed platen 3; and a mold clamping unit driving device 7 configured to move the moving platen 5 with respect to the fixed platen 3 in the mold opening/closing direction.

The fixed platen 3 is mounted with a mold core 21 at the center of its front surface (facing the moving platen 5) and has a through-hole 3a that is formed therethrough from its rear surface to its front surface for letting the first injection unit 17 move with respect to the mold core 21.

The mold core 21 has a hot runner 21a for introducing a melt resin injected from the first injection unit 17 into a first cavity formed by the mold core 21, and a hot runner 21b for introducing a melt resin injected from the second injection unit 18 into a second cavity formed by the mold core 21. The hot runners 21a and 21b of the mold core 21 each have a shut/open switching valve (not shown).

Tie bars 9 are provided to protrude from the four corners of the fixed platen 3 and to go through the moving platen 5.

The moving platen 5 is free to move with respect to the fixed platen 3 by means of a toggle-type mold clamping unit 14 guided by the tie bars 9 and driven by the mold clamping unit driving device 7.

The moving platen 5 is mounted with a plate-shaped dummy plate 6 at the center of its surface facing the mold core 21 of the fixed platen 3, and with a rotary platen coupling mechanism 15 capable of coupling and integrating the moving platen 5 and the rotary platen 4.

The rotary platen coupling mechanism 15 has a knock pin or the like of which leading end portion 15a is moved back and forth hydraulically or by a servomotor or the like. When the dummy plate 6 of the moving platen 5 and a first mold cavity 19 or a second mold cavity 20 of the rotary platen 4 are touched, the rotary platen coupling mechanism 15 moves the leading end portion 15a forth from a top or a side surface of the moving platen 5 to be coupled with a top or a side surface of the rotary platen 4, thereby integrating the moving platen 5 and the rotary platen 4.

The rotary platen coupling mechanism 15 may be provided on any of the moving platen 5 and the rotary platen 4, or may be embodied as a coupling mechanism provided on the dummy plate 6 of the moving platen 5 or on the first mold cavity 19 and second mold cavity 20 of the rotary platen 4 as a hydraulically-driven clamp mechanism, a magnet clamp mechanism to provide coupling by a magnetic force, etc.

The rotary platen 4 is formed in a plate shape having surfaces facing the fixed platen 3 and the moving platen 5 respectively, and installed on a rotary platen moving unit 12 through a rotary platen rotating mechanism 11 configured to rotate the rotary platen 4 about a rotary shaft 13 such that the rotary platen 4 makes a rotation about a vertical axis.

The rotary platen 4 is mounted with the first mold cavity 19 at the center of one of its surfaces, and with the second mold cavity 20 at the center of the other surface.

The rotary platen 4, the rotary platen rotating mechanism 11, and the rotary platen moving unit 12 may be separate members that can be mounted on a molding apparatus for single-layer molding.

The rotary platen rotating mechanism 11 has a support mechanism configured by an annular guide or the like capable of supporting and rotating the load of the rotary platen 4 including the first mold cavity 19 and the second mold cavity 20. The rotary platen rotating mechanism 11 is configured to rotate the rotary platen 4 about the rotary shaft 13 at an arbitrary position to which it is moved by an independent drive device such as a servomotor or the like.

The rotary platen moving unit 12 includes a linear guide mechanism configured by a combination of a ball screw, a ball screw nut, a linear motion guide, etc., and a drive device such as a servomotor or the like combined with them. When the moving platen 5 and the rotary platen 4 are coupled by the rotary platen coupling mechanism 15 provided on the moving platen 5, the rotary platen moving unit 12 is capable of moving the rotary platen 4 in the mold opening/closing direction within the range of a mold opening/closing stroke in conjunction with the mold opening/closing operation of the moving platen 5. The rotary platen moving unit 12 is also configured to stop the rotary platen 4 at an arbitrary position and maintain it at this position.

If there is no need of changing the position at which to stop the rotary platen 4 when opening the molds, it is possible to use a hydraulic cylinder or the like as the drive device of the rotary platen moving unit 12, by employing an embodiment in which the stroke end of the rotary platen 4 is defined as the position at which to stop the rotary platen 4 when opening the molds. Use of a hydraulic cylinder allows for simplifying the configuration of the rotary platen moving unit 12.

The first mold cavity 19 and the second mold cavity 20 of the rotary platen 4 are formed in different shapes. The first mold cavity 19 is formed in a shape which, when clamped against the mold core 21 of the fixed platen 3, forms a first cavity that can form a first molded component. The second mold cavity 20 is formed in a shape which, when clamped against the mold core 21 of the fixed platen 3, forms a second cavity that can form a second molded component on the surface of the first molded component left on the mold core 21.

The first injection unit 17 is detachably provided on the rear surface of the fixed platen 3, and configured such that a nozzle 17a from which a melt resin is injected touches on the rear surface (the right-hand-side surface in FIG. 1A) of the mold core 21 through the through-hole 3a of the fixed platen 3 and fills a melt resin in the first cavity through the hot runner 21a of the mold core 21.

The first injection unit 17 may be provided fixedly with the nozzle 17a touching on the rear surface of the mold core 21, or may be able to be moved with respect to the mold core 21 by an unillustrated moving mechanism or the like.

The first injection unit 17 may be a separate member that can be mounted on a molding apparatus for single-layer molding.

The second injection unit 18 is detachably provided on the front surface of the fixed platen 3 such that a nozzle 18a from which a melt resin is injected touches on a side surface (the upper surface in FIG. 1A) of the mold core 21 in a direction perpendicular to the mold opening/closing direction. The second injection unit 18 is configured such that the nozzle 18a touches on the side surface of the mold core 21 and fills a melt resin in the second cavity through the hot runner 21b of the mold core 21.

The second injection unit 18 may be provided fixedly with the nozzle 18a touching on the side surface of the mold core 21, or may be able to be moved with respect to the mold core 21 by an unillustrated moving mechanism or the like. Furthermore, the second injection unit 18 may be provided approximately in parallel with the first injection unit 17 or at a certain angle from the first injection unit 17, such that the nozzle 18a touches on the mold core 21 through the through-hole 3a of the fixed platen 3 or unillustrated another through-hole provided nearby and fills a melt resin in the second cavity through the hot runner 21b of the mold core 21.

The second injection unit 18 may be a separate member that can be mounted on a molding apparatus for single-layer molding.

In an opened state shown in FIG. 1A, the moving platen 5 is at a mold opening limit position suitable for the molds height in use. The rotary platen 4 is located at a "position" at which it is rotatable being mounted with the first mold cavity 19 and the second mold cavity 20, and at which it can allow an unillustrated product taking out unit to be inserted between the mold core 21 of the fixed platen 3 and the second mold cavity 20 of the rotary platen 4 (when a multilayer molded product is completed, the second mold cavity 20 of the rotary platen 4 is at the position facing the mold core 21 of the fixed platen 3; see FIG. 2F) so that the product taking out unit can take out the multilayer molded product pushed out from the mold core 21 of the fixed platen 3 by an unillustrated product push-out unit. The "position" described above at which the rotary platen 4 is stopped is set to an appropriate position as needed in accordance with the molds height in use, etc.

Next, first to fifth molding examples of the multilayer molding apparatus 1 according to the present embodiment will be explained with reference to FIGS. 2A to 6D.

In the first to fifth molding examples of the multilayer molding apparatus 1 according to the present embodiment, well-known thermoplastic resins that are melt-bondable can be used for forming a multilayer molded product. A first molded component to be formed as a first layer (a base layer on the mold core) of a multilayer molded product has a function of securing the shape, strength, and stiffness of the multilayer molded product. A second molded component to be formed as a second layer (a surface layer on the base layer) of the multilayer molded product has a function of improving the design properties of the multilayer molded product by providing cover for any appearance defect of the first molded component, color expression, decorative expression for the whole or some part of the product, etc. and of giving a sense of softness to the surface layer when it is a foamed layer, or slip resistance to the surface layer when it is an un-foamed layer.

Thermoplastic resin for the first molded component may be, for example, polypropylene (PP) and polyethylene (PE) which are easily available and price-stable, a versatile resin such as acrylonitrile, butadiene, styrene copolymer synthetic resin (ABS resin), etc., a recycled product of these resins, etc. Thermoplastic resin for the second molded component may be, for example, a thermoplastic resin different from the material of the first molded component, a resin same as the material of the first molded component but having a different color tone, an elastomer resin such as thermoplastic elastomer (TPO), styrene elastomer (SBC), urethane elastomer (TPU), etc. It is possible to improve the strength and stiffness of the second molded component by blending these thermoplastic resins with a fiber reinforced resin reinforced by glass fiber, carbon fiber, natural fiber, etc., and to give such properties as flame retardance, antistatic performance, etc. to the second molded component by adding various additives such as a flame retardant, a conducting agent, etc.

A foamed layer of a multilayer molded product can be formed from a foamable melt resin obtained by a well-known method such as a method of mixing a foaming agent in a thermoplastic resin in advance (chemical foaming method), a method of injecting a foaming gas when injection-filling a thermoplastic resin (physical foaming method), etc.

First Molding Example

A first molding example of the multilayer molding apparatus 1 according to the present embodiment will be explained with reference to FIGS. 2A to 2G. FIGS. 2A to 2G are plan views showing process steps of the first molding example of the multilayer molding apparatus according to the present embodiment. The first molding example is for forming a first molded component from an unfoamable melt resin, and a second molded component from a formable melt resin.

Figure 2A:
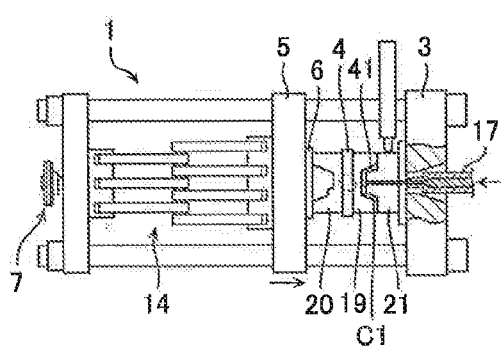
FIGS. 2A to 2G are plan views showing process steps of a first molding example of the multilayer molding apparatus according to the present embodiment.

First, as shown in FIG. 2A, the moving platen 5 and the rotary platen 4 are clamped in the direction toward the fixed platen 3 by the toggle-type mold clamping unit 14 of the mold clamping unit driving device 7. Specifically, first, the moving platen 5 is clamped by the toggle-type mold clamping unit 14 to the rotary platen 4 that is positioned at the "position" described above by the rotary platen moving unit 12, and the dummy plate 6 of the moving platen 5 is touched with the second mold cavity 20. After the molds are touched, the moving platen 5 and the rotary platen 4 are integrated by the rotary platen coupling mechanism 15, and then the rotary platen 4 is released from the integration by the rotary platen moving unit 12. Next, the moving platen 5 and the rotary platen 4 integrated together are clamped by the toggle-type mold clamping unit 14 to touch the first mold cavity 19 of the rotary platen 4 with the mold core 21 of the fixed platen 3.

After every pair of molds are touched, the first mold cavity 19 of the rotary platen 4 and the mold core 21 of the fixed platen 3 are clamped and the dummy plate 6 of the moving platen 5 and the second mold cavity 20 of the rotary plate 4 are clamped by the toggle-type mold clamping unit 14 (a first mold clamping step).

After the first mold clamping step, a first molded component 41 is formed by firstly injecting filling a first material into the first cavity C1 formed by the first mold cavity 19 of the rotary platen 4 and the mold core 21 of the fixed platen 3 from the first injection unit 17 through the hot runner 21a of the mold core 21 in accordance with a preset injection filling pattern (a first molding step).

Figure 2E:
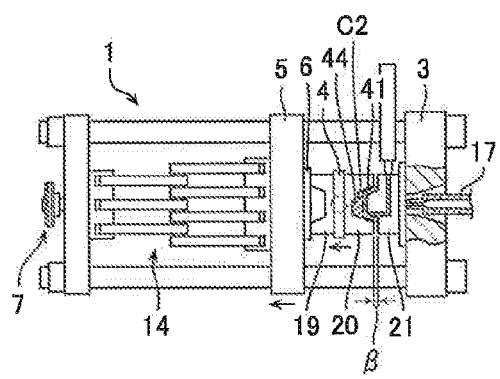
Figure 2B:
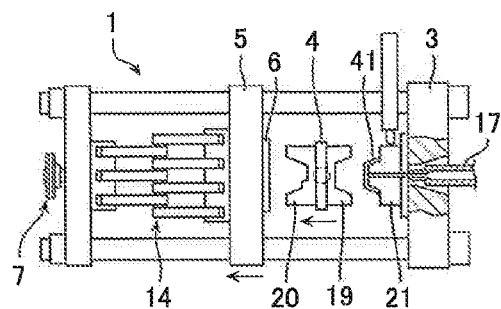

After a certain cooling and solidification time passes, the moving platen 5 and the rotary platen 4 are opened in a direction to be separated from the fixed platen 3 with the first molded component 41 held on the mold core 21 of the fixed platen 3, as shown in FIG. 2B. Specifically, first, the moving platen 5 and the rotary platen 4 integrated together are opened by the toggle-type mold clamping unit 14 until the rotary platen 4 reaches the "position" described above. Next, when the rotary platen 4 reaches the "position" described above, the rotary platen 4 is stopped by the rotary platen moving unit 12, and at the same time, the rotary platen coupling mechanism 15 is released. Then, the moving platen 5 is continuously opened to the mold opening limit position by the toggle-type mold clamping unit 14 (a mold opening step).

Figure 2F:
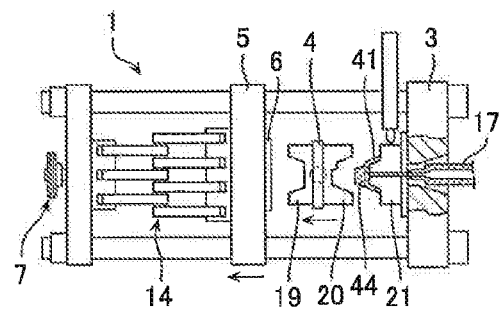
Figure 2C:
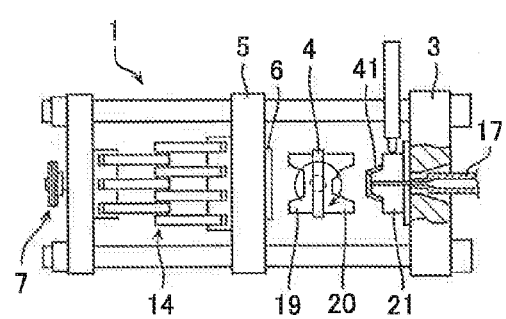

After the mold opening step, the rotary platen 4 is rotated at the "position" described above by 180 degrees by the rotary platen rotating mechanism 11 to switch the second mold cavity 20 of the rotary platen 4 to the position facing the mold core 21 of the fixed platen 3 as shown in FIG. 2C (a rotating step).

Figure 2G:
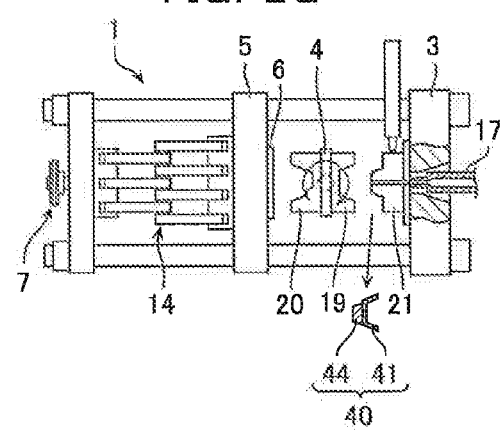
Figure 2D:
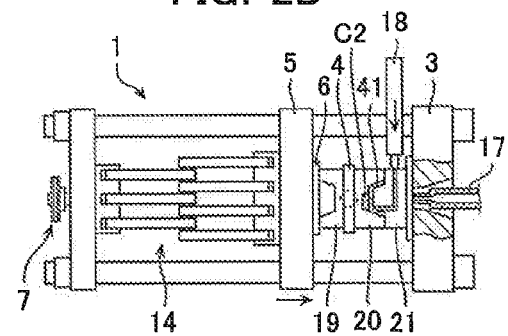

After the rotating step, as shown in FIG. 2D, the moving platen 5 and the rotary platen 4 are again clamped to touch the second mold cavity 20 of the rotary platen 4 with the mold core 21 of the fixed platen 3 on which the first molded component 41 is held. The operation of clamping the moving platen 5 and the rotary platen 4 will not be described because it is the same as the operation described above. After every pair of molds are touched, the second mold cavity 20 of the rotary platen 4 and the mold core 21 of the fixed platen 3 are clamped and the dummy plate 6 of the moving platen 5 and the first mold cavity 19 of the rotary platen 4 are clamped by the toggle-type mold clamping unit 14 (a second mold clamping step).

After the second mold clamping step, a second material, which is a foamable melt resin, is secondly injection-filled into the second cavity C2 formed by the second mold cavity 20 of the rotary platen 4 and the surface of the first molded component 41 held on the mold core 21 of the fixed platen 3 from the second injection unit 18 through the hot runner 21b of the mold core 21 in accordance with a preset injection filling pattern (a second injection filling step).

After the second injection filling step, as shown in FIG. 2E, the moving platen 5 and the rotary platen 4 are integrally opened by a quantity β by the toggle-type mold clamping unit 14 such that the foamable melt resin expands in the second cavity C2 to thereby form a second molded component 44 covered by an un-foamed skin layer and containing micro-cell foam on a part or the whole of the surface of the first molded component 41 (a slight mold opening step).

After a certain cooling and solidification time passes, the moving platen 5 and the rotary platen 4 are opened as shown in FIG. 2F (a mold opening step). The operation of opening the moving platen 5 and the rotary platen 4 will not be described because it is the same as the operation described above.

After the mold opening step, as shown in FIG. 2G, a multilayer molded product 40 formed of the first molded component 41 and the second molded component 44 held on the mold core 21 of the fixed platen 3 is taken out by an unillustrated product taking out unit (a product taking out step). After this, the rotary platen 4 is rotated by the rotary platen rotating mechanism 11 to switch the first mold cavity 19 of the rotary platen 4 to the position facing the mold core 21 of the fixed platen 3 (a rotating step).

Afterwards, multilayer molded products 40 are formed continuously by repeating the molding cycles from the state of FIG. 2A to the state of FIG. 2G in the way described above.

As can be understood from the above, according to the first molding example, it is possible to secure stiffness of the multilayer molded product 40 by forming the first molded component 41 from an unfoamable melt resin, and to give a sense of softness to the surface layer of the product and improve weight saving, adiabaticity and sound insulation of the multilayer molded product 40 by forming the second molded component 44 from a foamable melt resin. Furthermore, according to the first molding example, it is possible to form a multilayer molded product 40 required to have cushioning properties and show a sense of premium, used for, for example, an automobile interior part such as an instrumental panel, a door trim component, a glove compartment cover, etc. a building material such as a floor material, sundry goods, toys, etc.

Second Molding Example

Next, a second molding example of the multilayer molding apparatus 1 according to the present embodiment will be explained with reference to FIGS. 3A to 3H. FIGS. 3A to 3H are plan views showing process steps of the second molding example of the multilayer molding apparatus according to the present embodiment. The second molding example is for forming a first molded component and a second molded component from a foamable melt resin. In the second molding example, the step of forming a first molded component 43 will only be explained because the step of forming a second molded component 44 is the same as in the first molding example.

First, as in the first molding example, the first mold cavity 19 of the rotary platen 4 and the mold core 21 of the fixed platen 3 are clamped and the dummy plate 6 of the moving platen 5 and the second mold cavity 20 of the rotary platen 4 are clamped by the toggle-type mold clamping unit 14 of the mold clamping unit driving device 7 (a first mold clamping step).

Figure 3A:
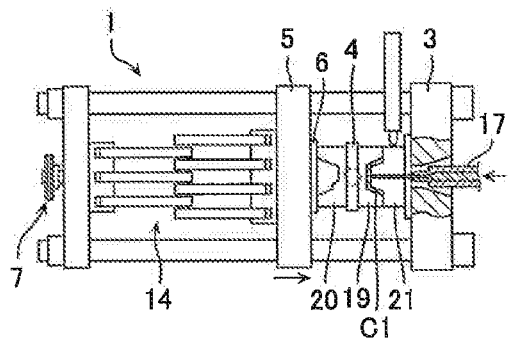
FIGS. 3A to 3H are plan views showing process steps of a second molding example of the multilayer molding apparatus according to the present embodiment.
Figure 3E:
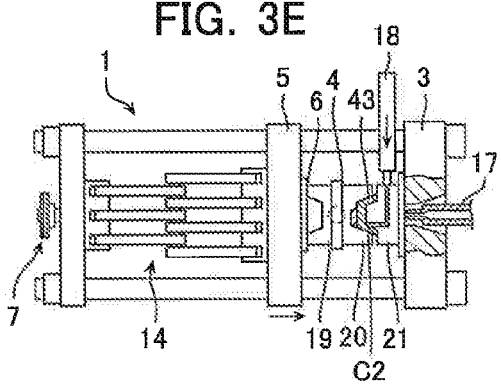

After the first mold clamping step, as shown in FIG. 3A, a first material, which is a foamable melt resin, is firstly injection-filled into the first cavity C1 formed by the first mold cavity 19 of the rotary platen 4 and the mold core 21 of the fixed platen 3 from the first injection unit 17 through the hot runner 21 of the mold core 21 in accordance with a preset injection filling pattern (a first injection filling step).

Figure 3B:
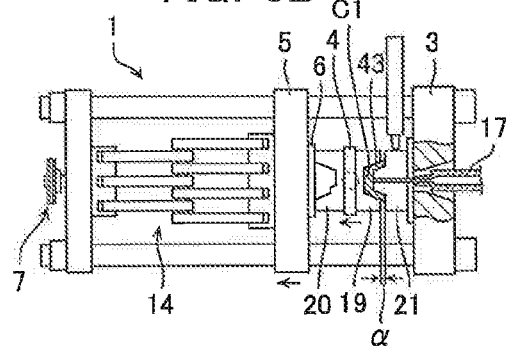
Figure 3F:
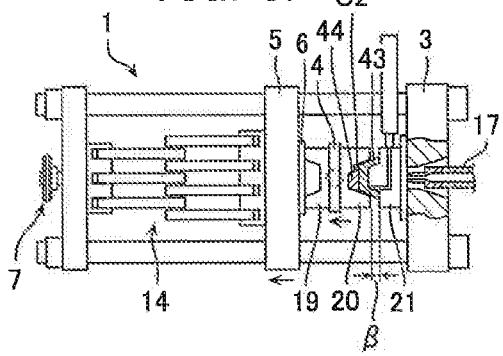

After the first injection filling step, as shown in FIG. 3B, the moving platen 5 and the rotary platen 4 are integrally opened by a quantity et by the toggle-type mold clamping unit 14 such that the foamable melt resin expands in the first cavity C1 to thereby form a first molded component 43 covered by an un-foamed skin layer and containing micro-cell foam (a slight mold opening step).

Figure 3C:
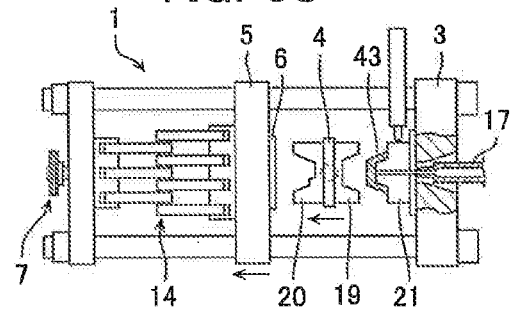
Figure 3G:
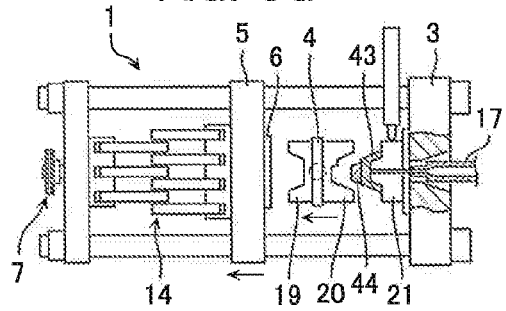
Figure 3D:
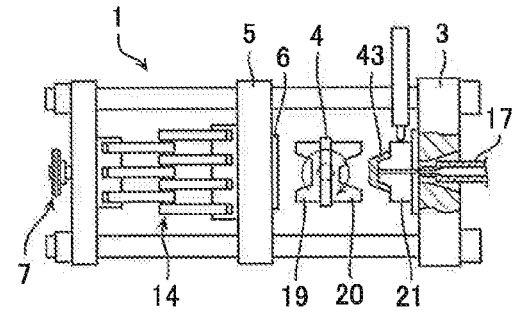

After a certain cooling and solidification time passes, the moving platen 5 and the rotary platen 4 are opened in a direction to be separated from the fixed platen 3 with the first molded component 43 held on the mold core 21 of the fixed platen 3, as in the mold opening step of the first molding example (see FIG. 3C).

After this, by the same molding step as in the first molding example, a second molded component 44 covered by an un-foamed skin layer and containing micro-cell foam is formed on a part or the whole of the surface of the first molded component 43, and a foamed multilayer molded product 40' formed of the first molded component 43 and the second molded component 44 is taken out by an unillustrated product taking out unit (see FIG. 3D to FIG. 3H).

Figure 3H:
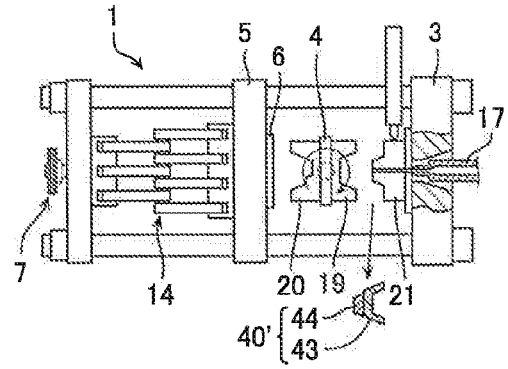

Afterwards, foamed multilayer molded products 40' are formed continuously by repeating the molding cycles from the state of FIG. 3A to the state of FIG. 3H in the way described above.

According to the second molding example, by forming the first molded component 43 and the second molded component 44 from a foamable melt resin, it is possible to secure stiffness of the foamed multilayer molded product 40' and at the same time to improve weight saving, adiabaticity, and sound insulation of the foamed multilayer molded product 40' by foam molding. Furthermore, according to the second molding example, it is possible to form automobile interior parts, etc. that are more weight-saved than when formed according to the first molding example, and hence realize reduction of fuel consumption of automobiles.

Third Molding Example

Next, a third molding example of the multilayer molding apparatus 1 according to the present embodiment will be explained with reference to FIGS. 4A to 4F. FIGS. 4A to 4F are plan views showing process steps of the third molding example of the multilayer molding apparatus according to the present embodiment. The third molding example is for forming a first molded component and a second molded component from an unfoamable melt resin. In the third molding example, only the step of forming a second molded component 42 will be explained because the step of forming a first molded component 41 is the same as in the first molding example.

Figure 4A:
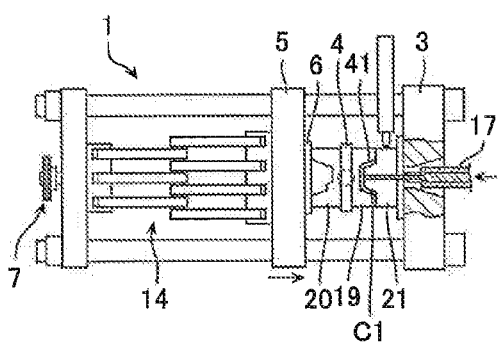
FIGS. 4A to 4F are plan views showing process steps of a third molding example of the multilayer molding apparatus according to the present embodiment.

First, by the same molding step as in the first molding example, a first molded component 41 is formed in the first cavity C1 formed by the first mold cavity 19 of the rotary platen 4 and the mold core 21 of the fixed platen 3 (see FIG. 4A).

Figure 4D:
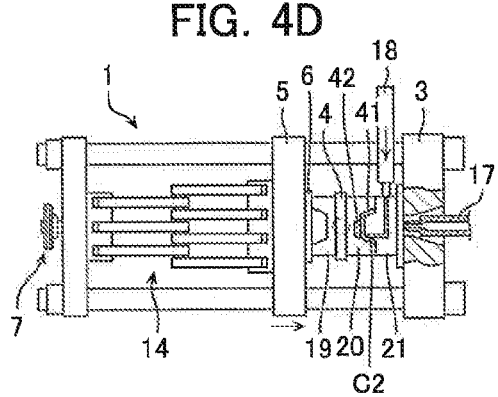
Figure 4B:
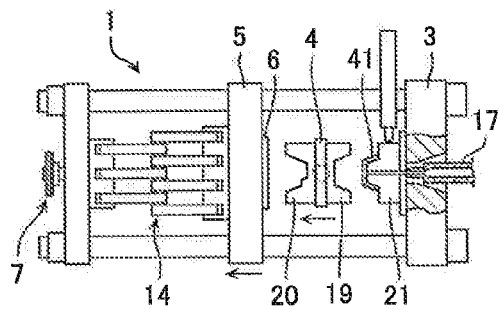
Figure 4E:
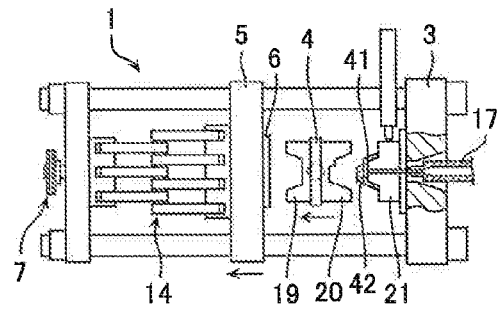
Figure 4C:
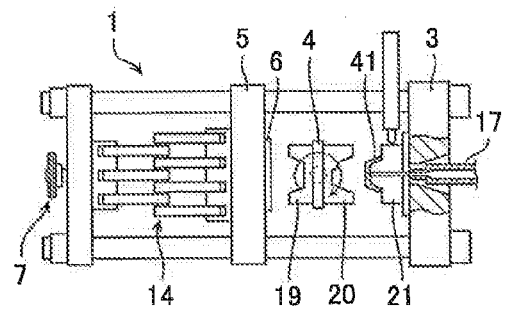

After a certain cooling and solidification time passes, as in the mold opening step of the first molding example, the moving platen 5 and the rotary platen 4 are opened in a direction to be separated from the fixed platen 3 with the first molded component 41 held on the mold core 21 of the fixed platen 3, (see FIG. 4B). Likewise, as in the rotating step of the first molding example, the rotary platen 4 is rotated by 180 degrees by the rotary platen rotating mechanism 11 to switch the second mold cavity 20 of the rotary platen 4 to the position facing the mold core 21 of the fixed platen 3 (see FIG. 4C). Furthermore, as in the second mold clamping step of the first molding example, the second mold cavity 20 of the rotary platen 4 and the mold core 21 of the fixed platen 3 are clamped and the dummy plate 6 of the moving platen 5 and the first mold cavity 19 of the rotary platen 4 are clamped by the toggle-type mold clamping unit 14.

After the second mold clamping step, as shown in FIG. 4D, a second molded component 42 is formed on a part or the Whole of the surface of the first molded component 41, by secondly injection-filling a second material into the second cavity C2 formed by the second mold cavity 20 of the rotary platen 4 and the surface of the first molded component 41 held on the mold core 21 of the fixed platen 3 from the second injection unit 18 through the hot runner 21b of the mold core 21 in accordance with a preset injection filling pattern (a second molding step).

Figure 4F:
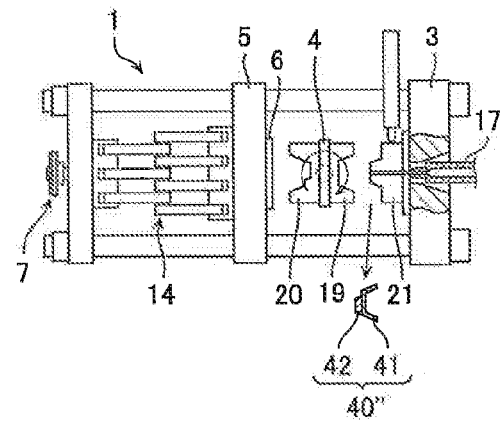

After a certain cooling and solidification time passes, as in the mold opening step of the first molding example, the moving platen 5 and the rotary platen 4 are opened (see FIG. 4E), and a multilayer molded product 40" formed of the first molded component 41 and the second molded component 42 is taken out by an unillustrated product taking out unit (see FIG. 4F).

Afterwards, multilayer molded products 40" are formed continuously by repeating the molding cycles from the state of FIG. 4A to the state of FIG. 4F in the way described above.

According to the third molding example, by forming the first molded component 41 and the second molded component 42 from an unfoamable melt resin, it is possible to secure stiffness of the multilayer molded product 40" and at the same time to give a design and functionality such as slip resistance to the multilayer molded product 40" by the second molded component 42. Furthermore, according to the third molding example, it is possible to form a multilayer molded product 40" for an automobile interior part such as a console box, an assist grip, an airbag cover, etc., sundry goods such as a shaver, a toothbrush, etc., stationery such as a mechanical pencil, a grip for tools, sporting goods, medical devices, etc.

In the third molding example, the first molded component 41 may be formed from a melt of a recycled resin from a container, or a melt of a recycled resin from wastages of automobile parts, home appliances, etc. By forming the first molded component 41 from a melt of a recycled resin, it is possible to secure stiffness of the multilayer molded product 40" and at the same time to reduce environmental impact. When a melt of a recycled resin is used for the first molded component 41, it is possible to form a multilayer molded product 40" for, for example, a transportation pallet for logistics, an automobile part such as a bumper, etc., home appliances, etc.

Fourth Molding Example

Next, a fourth molding example of the multilayer molding apparatus 1 according to the present embodiment will be explained. The fourth molding example of the multilayer molding apparatus 1 according to the present embodiment uses injection press molding (compression molding), and as shown in FIGS. 5A to 5G, forms a glass alternative resin molded product 40'" by forming a first molded component 43' from, for example, a melt resin such as of a transparent polycarbonate resin, etc. as an alternative material for glass, and forming a second molded component 42 from, for example, a melt resin such as of a colored polycarbonate alloy resin, etc. as a support member. FIGS. 5A to 5G are plan views showing process steps of the fourth molding example of the multilayer molding apparatus according to the present embodiment. In the fourth molding example, only the step of forming a first molded component 43' will be explained because the step of forming a second molded component 42 is the same as in the third molding example.

First, by the same method as in the first molding example, the moving platen 5 and the rotary platen 4 are closed by the toggle-type mold clamping unit 14 to a position at which the mold core 21 of the fixed platen 3 and the first mold cavity 19 of the rotary platen 4 are slightly gapped from each other by a quantity α to form a first cavity C1 (a mold closing step).

Figure 5A:
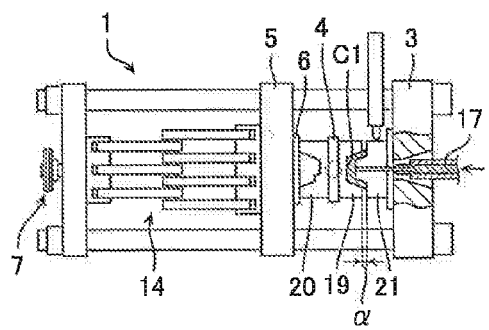
FIGS. 5A to 5G are plan views showing process steps of a fourth molding example of the multilayer molding apparatus according to the present embodiment.
Figure 5E:
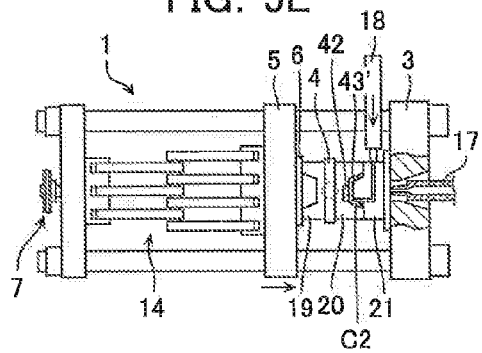

After the mold closing step, as shown in FIG. 5A, a first material is firstly injection-filled into the first cavity C1 formed by the first mold cavity 19 and the mold core 21 from the first injection unit 17 through the hot runner 21a of the mold core 21 in accordance with a preset injection filling pattern (a first injection filling step).

Figure 5B:
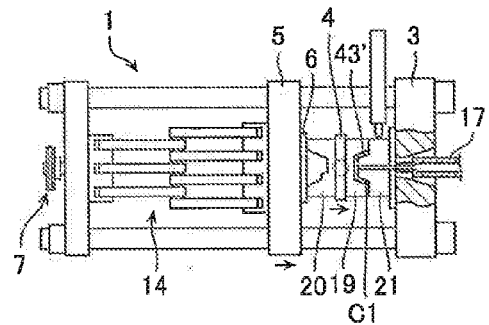
Figure 5F:
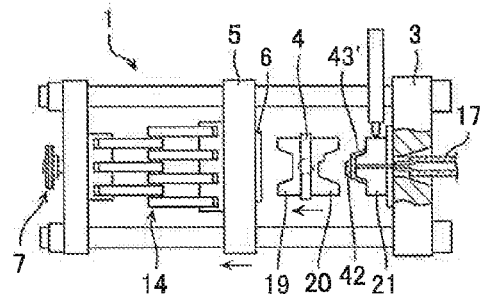

In conjunction with the first injection filling step or after the first injection filling step, as shown in FIG. 5B, the moving platen 5 and the rotary platen 4 are integrally moved in the mold closing direction by the toggle-type mold clamping unit 14 to clamp the first mold cavity 19 and the mold core 21 and clamp the dummy plate 6 of the moving platen 5 and the second mold cavity 20 of the rotary platen 4 (an injection press step). Thereby, the first material is compressed in the first cavity C1 and molded into a first molded component 43'.

Figure 5C:
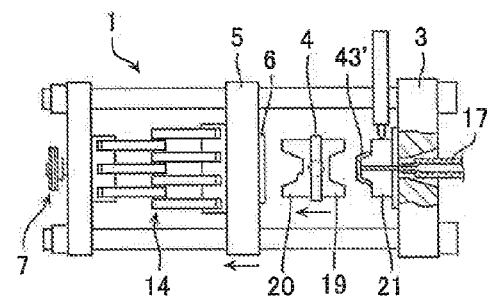

After a certain cooling and solidification time passes, as in the mold opening step of the first molding example, the moving platen 5 and the rotary platen 4 are opened in a direction to be separated from the fixed platen 3 with the first molded component 43' held on the mold core 21 of the fixed platen 3 (see FIG. 5C).

Figure 5G:
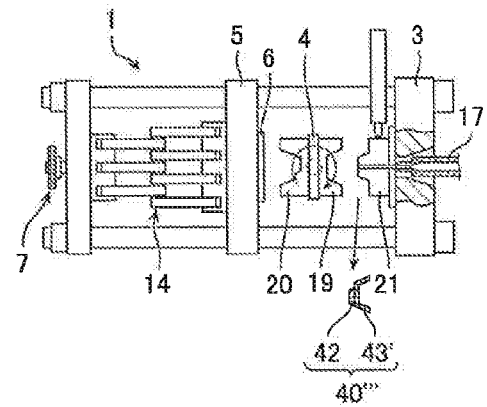
Figure 5D:
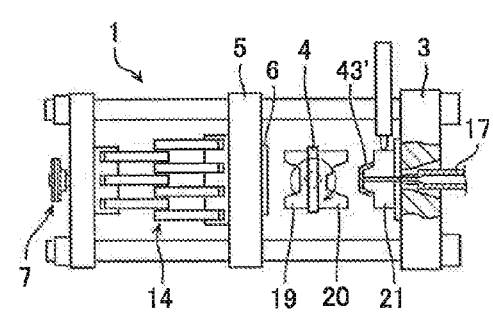

After this, by the same molding step as in the third molding example, a second molded component 42 is formed on a part or the whole of the surface of the first molded component 43', and a glass alternative resin molded product 40'" formed of the first molded component 43' and the second molded component 42 is taken out by an unillustrated product taking out unit (see FIG. 5I) to FIG. 5G).

Afterwards, glass alternative resin molded products 40'" are formed continuously by repeating the molding cycles from the state of FIG. 5A to the state of FIG. 5G in the way described above.

According to the fourth molding example, since high-precision injection press molding is available, it is possible to obtain a high deformation suppressing effect at the injection filling step, and since a retaining pressure is uniformly applied from the part of the toggle-type mold clamping unit 14 (from the part of the first mold cavity 19), it is possible to obtain a high product deformation suppressing effect. Furthermore, according to the fourth molding example, it is possible to form a glass alternative resin molded product 40'" for, for example, resin glass for automobile exterior, a designed exterior parts for home appliances, office automation equipment, etc.

Fifth Molding Example

Next, a fifth molding example of the multilayer molding apparatus 1 according to the present embodiment will be explained. The fifth molding example of the multilayer molding apparatus 1 according to the present embodiment uses the same injection press molding (compression molding) as in the fourth molding example, and as shown in FIGS. 6A to 6D, forms a glass alternative resin molded product 40'''' by forming a first molded component 42' from, for example, a melt resin such as of a colored polycarbonate alloy resin, etc. as a support member, and forming a second molded component 43'' from a melt resin such as of a transparent polycarbonate resin, etc. as an alternative material for glass. FIGS. 6A to 6D are plan views showing process steps of the fifth molding example of the multilayer molding apparatus according to the present embodiment. In the fifth molding example, a glass alternative resin molded product is formed by changing the orders of the molding process of the first molded component 43' and the molding process of the second molded component 42 from their orders in the fourth molding example. Therefore, a detailed explanation will be given only on steps different from the fourth molding example, and skipped on steps that are the same.

Figure 6A:
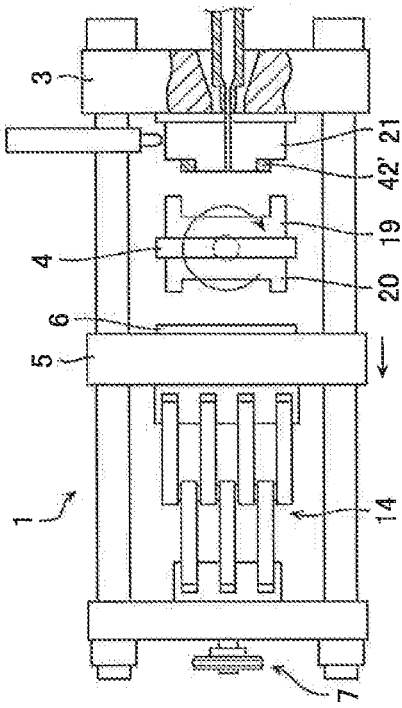
FIGS. 6A to 6D are plan views showing process steps of a fifth molding example of the multilayer molding apparatus according to the present embodiment.
Figure 6B:
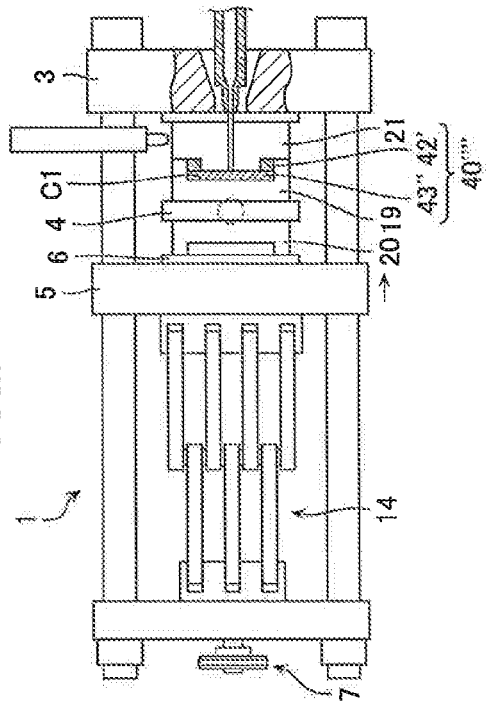

First, by the same molding step as for forming the second molded component 42 in the fourth molding example, a first molded component 42' is formed from a melt resin such as of a colored polycarbonate alloy resin in the second cavity C2 formed by the second mold cavity 20 and the mold core 21 as shown in FIG. 6A. After a certain cooling and solidification time passes, the moving platen 5 and the rotary platen 4 are opened in a direction to be separated from the fixed platen 3 with the first molded component 42' held on the mold core 21 of the fixed platen 3, and the rotary platen 4 is rotated to switch the first mold cavity 19 of the rotary platen 4 to the position facing the mold core 21 of the fixed platen 3 (see FIG. 6B).

Figure 6C:
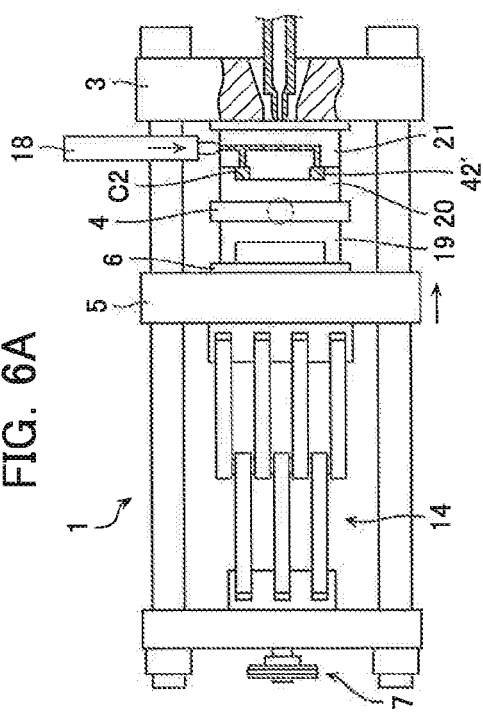

Next, by the same molding step as for forming the first molded component 43' in the fourth molding example, the moving platen 5 and the rotary platen 4 are closed by the toggle-type mold clamping unit 14 to a position at which the mold core 21 of the fixed platen 3 and the first mold cavity 19 of the rotary platen 4 are slightly gapped from each other by a quantity α to form the first cavity C1 as shown in FIG. 6C (a mold closing step). After the mold closing step, a melt resin such as of a transparent polycarbonate resin is injection-filled into the first cavity C1 formed by the first mold cavity 19 and the mold core 21 from the first injection unit 17 (a second injection filling step).

Figure 6D:
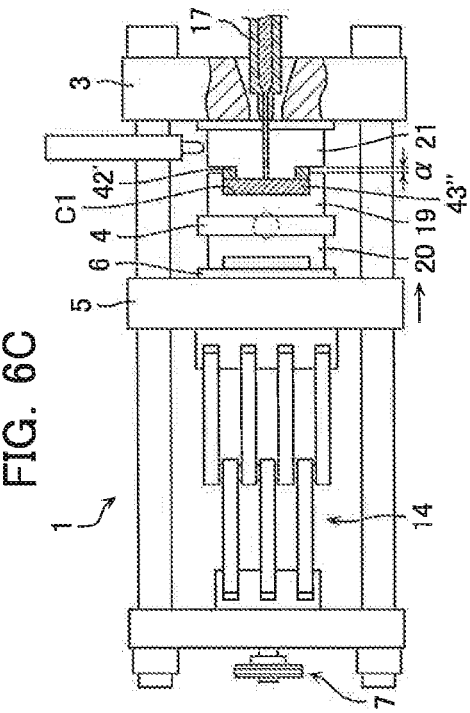

In conjunction with the second injection filling step or after the second injection filling step, as shown in FIG. 6D, the moving platen 5 and the rotary platen 4 are integrally moved in the mold closing direction by the toggle-type mold clamping unit 14 to clamp the first mold cavity 19 and the mold core 21 against each other and the dummy plate 6 of the moving platen 5 and the second mold cavity 20 of the rotary platen 4 against each other (an injection press step). Thereby, the second material (a melt resin such as of a transparent polycarbonate resin) is compressed in the first cavity C1 to be molded into a second molded component 43' and thus a glass alternative resin molded product 40'''' can be formed.

According to the fifth molding example, it is possible to form a glass alternative resin molded product with the same constitution as by the fourth molded example, by forming the first molded component 42' to become the surface layer by molding, and then forming the second molded component 43'' to become the base layer by injection press molding. Furthermore, in the fifth molding example, by forming the first molded component 42' as the base layer and the second molded component 43'' as the surface layer, it is possible to form a glass alternative resin molded product of which base layer and surface layer are interchanged from what they are in the glass alternative resin molded product 40''' of the fourth molded product.

In the first to fifth molding examples of the multilayer molding apparatus 1 according to the present embodiment, the moving platen 5 and the rotary platen 4 are integrated by the rotary platen coupling mechanism 15, and the moving platen 5 and the rotary platen 4 integrated together are moved in the mold opening/closing direction by the toggle-type mold clamping unit 14. However, this is not limiting, and the rotary platen 4 and the moving platen 5 may be controlled to move in the mold opening/closing direction by independent drive sources respectively, for example, by the rotary platen moving unit 12 and the toggle-type mold clamping unit 14. In this case, it is preferred that the movements of the rotary platen 4 and the moving platen 5 in the mold opening/closing direction be controlled simultaneously by the rotary platen moving unit 12 and the toggle-type mold clamping unit 14. Simultaneous control of the rotary platen moving unit 12 and the toggle-type mold clamping unit 14 may be used in combination with coupling by the rotary platen coupling mechanism 15, or alternatively coupling of the moving platen 5 and the rotary platen 4 by the rotary platen coupling mechanism 15 needs not be used.

That is, in the first to fifth molding examples, the first mold clamping (second mold clamping) step is performed by touching the dummy plate 6 of the moving platen 5 with the second mold cavity 20 (or the first mold cavity 19) of the rotary platen 4, and after this, touching the first mold cavity 19 (or the second mold cavity 20) of the rotary platen 4 with the mold core 21 of the fixed platen 3. This is not limiting. For example, the rotary platen 4 and the fixed platen 3 may be clamped by the rotary platen moving unit 12 to touch the first mold cavity 19 (or the second mold cavity 20) with the mold core 21, after this, the moving platen 5 and the rotary platen 4 may be clamped by the toggle-type mold clamping unit 14 to touch the dummy plate 6 with the second mold cavity 20 (or the first mold cavity 19), and after this, the moving platen 5 and the rotary platen 4 may be integrated by the rotary platen coupling mechanism 15 or they may be controlled simultaneously by the rotary platen moving unit 12 and the toggle-type mold clamping unit 14.

Further, in the first to fifth molding examples, the mold opening step is performed by opening the moving platen 5 and the rotary platen 4 integrated by the toggle-type mold clamping unit 14, and after this, releasing the rotary platen coupling mechanism 15 and opening only the moving platen 5 further by the toggle-type mold clamping unit 14. This is not limiting. After coupling between the moving platen 5 and the rotary platen 4 by the rotary platen coupling mechanism 15 is released, only the moving platen 5 may be opened by the toggle-type mold clamping unit 14, and at the same time as this or after this, the rotary platen 4 may be opened by the rotary platen moving unit 12.

Furthermore, in the slight mold opening step and the mold closing step in the first, second, fourth, and fifth molding examples, the moving platen 5 and the rotary platen 4 are slightly opened by the quantities α and β and closed by the toggle-type mold clamping unit 14. This is not limiting. The rotary platen 4 and the moving platen 5 may be slightly opened by the quantities α and β and closed by being controlled such that their movements in the mold opening/closing direction by the rotary platen moving unit 12 and the toggle-type mold clamping unit 14 are performed simultaneously.

The multilayer molding method according to the present invention is not limited to the first to fifth molding examples, but may control the operations available with the apparatus configuration of the present invention in various combinations in accordance with restrictions by the molds, multilayer molded products, etc. For example, other than the first to fifth molding examples, the multilayer molding apparatus 1 according to the present embodiment can also form a multilayer molded product in which the base layer is made of a foamed layer and the surface layer is made of an un-foamed layer. Such a multilayer molded product can be formed with the first molded product from a foamable melt resin and the second molded product from an unfoamable melt resin, or with the base layer from the un-foamed layer in the first cavity C1 in the first molding example and the surface layer from the foamed layer in the second cavity C2. Other than the first to fifth molding examples, the multilayer molding apparatus 1 according to the present embodiment may form the first molded component and the second molded component by injection press molding, or form either one of the first molded component and the second molded component by foam molding and the other by injection press molding. Furthermore, the multilayer molding apparatus 1 according to the present embodiment can also perform single-layer molding by integrating the rotary platen 4 and the moving platen 5 by the rotary platen coupling mechanism 15, a fastener member, or the like.

The conventional multilayer molding apparatus of Patent Document 1 has the first injection unit and the second injection unit arranged to face each other in the apparatus's longer direction, and in addition, has the first injection unit move forward and backward in the mold opening/closing direction, i.e., in the apparatus's longer direction in conjunction with the mold opening/closing operation of the moving platen. Therefore, there is a problem that the total length of the apparatus is long as compared with a conventional single layer molding apparatus, given that the area of the surface of the moving platen on which the mold is mounted is substantially the same between both the apparatuses. Further, in order to form one type of multilayer molded products, the apparatus needs the same molds to be mounted on the surfaces of the rotary platen facing the moving platen and the fixed platen respectively. Furthermore, because of employing a molding method by which a first molded component and a multilayer molded product are held on the male molds of the rotary platen, the apparatus needs a built-in product push-out unit in the rotary platen, and hence has a problem that the configuration of the rotary platen becomes complicated what with hydraulic, pneumatic, and electrical connections for driving them. In addition, since this multilayer molding apparatus is a dedicated molding apparatus for multilayer molding, there is a problem that the apparatus is incompatible with single-layer or single-color molding.

The multilayer molding apparatus of Patent Document 2 has the plurality of injection units arranged in parallel on the part of the fixed platen, and hence has a short length as compared with the total length of the multilayer molding apparatus of Patent Document 1, given that the area of a mold mounting surface of the moving platen is substantially the same between both the apparatuses. Further, since a moving mold is used in common for a fixed mold having a plurality of mold cavities, the apparatus does not need the same molds to be mounted on the part of the moving platen. Furthermore, the apparatus is capable of single-layer or single-color molding, and hence overcomes the problems of the multilayer molding apparatus of Patent Document 1. However, this multilayer molding apparatus has the following new problems.

First, since the multilayer molding apparatus of Patent Document 2 is configured such that the moving mold is guided by the mold holder of the moving platen to slide in the horizontal direction within the total width of the moving platen, the apparatus can only be mounted with a small mold in consideration of horizontal slide with respect to the total width of the moving platen. Further, since the fixed mold mounted on the fixed platen has a horizontal arrangement of the plurality of mold cavities to be paired with the moving mold, the apparatus of Patent Document 2 can only form a multilayer molded product having a smaller size than that of a multilayer molded product that can be formed by the multilayer molding apparatus of Patent Document 1, given that the area of the mold mounting surface of the moving platen is substantially the same between both the apparatuses. Furthermore, since the moving mold, of which projected area on the mold mounting surface of the moving platen is smaller than the area of the mold mounting surface, is clamped with the fixed mold at a position off approximately the center of the mold mounting surface of the moving platen, the molds cannot be clamped in a balanced condition. Therefore, the molds might be damaged or a melt resin might leak from the parting line of the molds during injection filling.

Furthermore, in order to form a larger-sized multilayer molded product by using larger-sized molds in the multilayer molding apparatus of Patent Document 2, it is necessary to increase the width of the fixed platen and the moving platen. However, it cannot be helped but to also increase the height of the platens to some degree to match the width, because if the width of the platens is only increased, the mold clamping force to be applied to the molds when clamping the molds becomes imbalanced in the width direction. However, since these size increases change nothing about the mold clamping configuration that the mold is located at a position of approximately the center of the moving platen, the mold clamping force to be applied to the molds becomes more imbalanced as the height and width of the platens become larger. As is clear from the above, in order to form a larger-sized multilayer molded product by the multilayer molding apparatus of Patent Document 2, it is necessary to increase the width and height of the fixed platen and the moving platen, and along with this to increase the size of the mold clamping unit and the bed of the molding apparatus. Hence, the multilayer molding apparatus becomes large with respect to the size of the multilayer molded product, and the mold clamping force to be applied to the molds when clamping the molds becomes imbalanced, which makes it difficult to form a high quality product.

As compared with the above, the multilayer molding apparatus and the multilayer molding method according to the present embodiment can achieve the following effects.

(1) Since the weight of the moving platen can be reduced because neither a mold nor an injection unit is assembled on the moving platen, the preciseness of its moving operation in the mold opening/closing direction can be improved.

(2) Since the at least two injection units are provided on the part of the fixed platen, the total apparatus length can become short as Compared with the conventional multilayer molding apparatus of Patent Document 1 having two facing injection units, given that the area of the mold mounting surface of the moving platen is the same between the apparatuses.

(3) Since the mold core is used in common for the mold cavities having different shapes, no duplicate molds are necessary for forming one type of multilayer molded products, and hence the number of molds to be used can be reduced.

(4) Since the present multilayer molding method leaves a first molded component and a multilayer molded product on the mold core of the fixed platen, it is unnecessary to provide a built-in product push-out unit in the rotary platen and hence hydraulic, pneumatic, and electrical connections for driving them, which enables to simplify the configuration of the rotary platen.

(5) Single-layer or single-color molding is available.

(6) Since the present multilayer molding apparatus has the mold cavities having different shapes mounted on opposite surfaces of the rotary platen respectively, the size of the mold cavity mounted on one surface of the rotary platen can become larger than in the conventional multilayer molding apparatus of Patent Document 2 in which a plurality of molds are mounted on the same surface of the fixed platen, given that the area of the mold mounting surface of the moving platen is substantially the same between the apparatuses. Hence, a multilayer molded product having a larger size can be formed.

(7) Since the molds are mounted at approximately the center of the mold mounting surfaces of the fixed platen and the moving platen, the molds can be clamped in a balanced condition when clamping the molds.

(8) The moving platen and the rotary platen are configured to be capable of moving in the mold opening/closing direction simultaneously, by being integrated by a mechanism that can couple the moving platen and the rotary platen or being controlled simultaneously by independent drive sources respectively. Therefore, it becomes possible to carry out foam molding which causes a foamable melt resin injection-filled in the cavity to expand, by opening the mold cavity of the rotary platen by a specified quantity simultaneously with the moving platen. It also becomes possible to carry out injection press molding which injection-fills a melt resin in the cavity while the molds are opened from each other by a specified quantity, and in conjunction with this or after this, clamps the mold cavity of the rotary platen simultaneously with the moving platen to compress the melt resin. Furthermore, because the mold clamping unit is of a toggle type, a high-precision control on the mold gapping quantity becomes available in foam molding and injection press molding where a high-precision control on the mold gapping quantity is required. Besides, a more high-precision control on the mold gapping quantity becomes available if the drive device of the mold clamping unit is an electrical servomotor.

(9) The present multilayer molding apparatus is based on the function of a conventional single layer molding apparatus of moving the moving platen with respect to the fixed platen by a mold clamping unit, and is also capable of making the moving platen and the rotary platen simultaneously perform the mold opening/closing operation by a mechanism that can couple them or by independent drive sources respectively. Therefore, the multilayer molding apparatus can carry out various molding methods by a conventional single layer molding apparatus that moves the moving platen with respect to the fixed platen by a mold clamping unit, such as foam molding described in the above item (8), an in-mold coating method, etc., in addition to single-layer or single-color molding and ordinary multilayer or multi-color molding. Furthermore, the apparatus is also capable of forming a multilayer molded product made by combining these methods.

(10) By adding injection units and a rotary platen, it is possible to easily convert a conventional single layer molding apparatus that moves the moving platen with respect to the fixed platen by a mold clamping unit, into a multi-functional multilayer molding apparatus that can achieve the effects (1) to (9) described above.

In the multilayer molding apparatus 1 according to the present embodiment, the mold core 21 of the fixed platen 3 is used as a common mold for the first mold cavity 19 and second mold cavity 20 of the rotary platen 4, cavity switching is performed on the part of the mold cavities of the rotary platen 4, and a first molded component and a multilayer molded product are held on the mold core 21 of the fixed platen 3 and not on the part of the rotary platen 4. These are the major differences of the present multilayer molding apparatus from the multilayer molding apparatus of Patent Document 1 in which the same male molds are mounted on both surfaces of the rotary platen, the rotary platen is rotated with a first molded component held on a male mold of the rotary platen, cavity switching is performed on the part of the female molds having different shapes mounted on the moving platen and the fixed platen respectively, injection filling is performed by injection units facing each other, and a multilayer molded product is also held on the male mold of the rotary platen. The present invention employs a rotary platen with a simplified configuration, and enables both first injection filling and second injection filling to be performed from the part of the same fixed platen. Further, in the multilayer molding apparatus 1 according to the present embodiment, cavity switching is performed on the part of the mold cavities mounted on the surfaces of the rotary platen 4 facing the dummy plate 6 of the moving platen 5 and the mold core 21 of the fixed platen 3 respectively, hence one type of mold cavity is mounted on one surface of the rotary platen 4, and the mold cavity can therefore be mounted at approximately the center of the rotary platen 4. These are the major differences of the present multilayer molding apparatus from the multilayer molding apparatus of Patent Document 2 in which cavity switching is performed on the part of a plurality of molds mounted on the same surface of the fixed platen or on the part of a mold having a plurality of mold cavities mounted on the same surface of the fixed platen. The present multilayer molding apparatus can form a multilayer molded product having a larger size than that of a multilayer molded product that can be formed by the multilayer molding apparatus of Patent Document 2 given than the area of the mold mounting surface of the moving platen is substantially the same between both the apparatuses, and can apply a mold clamping force to the molds in a balanced condition when clamping the molds.

The multilayer molding apparatus according to the present invention is not limited to the embodiment described above, but can be modified variously within the scope of the technical concept of the present invention. For example, in the multilayer molding apparatus 1 according to the present embodiment, the rotary platen 4 is rotated about a vertical axis. This is not limiting. The rotary platen 4 may be rotated about a horizontal axis perpendicular to the apparatus's longer direction.

In the multilayer molding apparatus 1 according to the present embodiment, the "position" at which the rotary platen 4 is stopped in the mold opening operation is a position at which the rotary platen 4 can rotate while being mounted with the first mold cavity 19 and the second mold cavity 20, and at which the rotary platen 4 can allow an unillustrated product taking out unit to be inserted between the mold core 21 of the fixed platen 3 and the second mold cavity 20 of the rotary platen 4 (when a multilayer molded product is completed, the second mold cavity 20 of the rotary platen 4 is at the position facing the mold core 21 of the fixed platen 3; see FIG. 2F), and the multilayer molded product pushed out from the mold core 21 of the fixed platen 3 by an unillustrated product push-out unit to be taken out. This is not limiting. The "position" may be varied from when the rotary platen 4 is rotated to when a multilayer molded product is taken out from between the fixed platen 3 and the rotary platen 4 by an unillustrated product taking out unit. In the latter case, by setting the rotary position 4 at a position closer than the "position" in the former case to the moving platen 5 and thereby providing a larger interval between the second mold cavity 20 of the rotary platen 4 and the mold core 21 of the fixed platen 3 when the molds are opened, it is possible to reduce design limitations on the product taking out unit.

Further, in the multilayer molding apparatus 1 according to the present embodiment, the surfaces of the rotary platen 4 that face the fixed platen 3 and the moving platen 5 respectively have a plate shape, and the rotary platen 4 is mounted with the first mold cavity 19 at the center of one of the surfaces and with the second mold cavity 20 at the center of the other surface. This is not limiting. For example, the rotary platen 4 may have a prism shape made up of three or more surfaces, and a mold cavity may be mounted on each of the surfaces.

Furthermore, in the multilayer molding apparatus 1 according to the present embodiment, the mold core 21, the first mold cavity 19 and second mold cavity 20, and the dummy plate 6 have already been mounted on the fixed platen 3, the rotary platen 4, and the moving platen 5, respectively. This is not limiting. It is only necessary that the multilayer molding apparatus be mountable with a mold core on the fixed platen, at least two mold cavities on the rotary platen, and a dummy plate on the moving platen.

Yet further, the multilayer molding apparatus 1 according to the present embodiment includes the rotary platen coupling mechanism 15. This is not limiting. The multilayer molding apparatus may include no rotary platen coupling mechanism 15, or the rotary platen coupling mechanism 15 may be a fastener member constituted by, for example, a bolt.

INDUSTRIAL APPLICABILITY

The present invention solves the problems of the conventional multilayer molding apparatuses described above, and as a result, can achieve the effect described in the foregoing section "Effect of the Invention". Therefore, the present invention has a great industrial applicability. Particularly, the present invention has a great industrial applicability in that it can easily convert a conventional single layer molding apparatus that moves the moving platen with respect to the fixed platen by a mold clamping unit, into a multi-functional multilayer molding apparatus, by adding injection units and a rotary platen. This is because the present invention is based on the function of a conventional single layer molding apparatus that moves the moving platen with respect to the fixed platen by a mold clamping unit, and hence can carry out various molding methods implemented by a conventional single layer molding apparatus that moves the moving platen with respect to the fixed platen by a mold clamping unit, such as foam molding, an in-mold coating method, etc., in addition to single-layer or single-color molding and ordinary multilayer or multicolor molding, and can also form a multilayer molded product made by combining these methods. That is, owing to the multilayer molding apparatus and multilayer molding method of the present invention, a company, especially a small- or middle-sized company which has been unable to introduce a dedicated multilayer molding apparatus because of limitations on apparatus installation space or apparatus purchase cost becomes able to change an already-installed conventional type single layer molding apparatus that moves the moving platen with respect to the fixed platen by a mold clamping unit to a multi-functional multilayer molding apparatus easily by conversion. Owing to the multilayer molding apparatus and multilayer molding method of the present invention, such a company also becomes able to form various types of multilayer molded products by foam molding, in-mold coat molding, etc., in addition to single-layer or single-color molding and ordinary multilayer or multi-color molding. Then, in response to a recent demand for manufacture of a wide variety of products in small quantities placed on multilayer molded products, they can improve the operation availability of each multilayer molding apparatus used for forming such a multilayer molded product.

DESCRIPTION OF REFERENCE NUMERALS

1 multilayer molding apparatus
3 fixed platen
4 rotary platen
5 moving platen
6 dummy plate
14 toggle-type mold clamping unit
15 rotary platen coupling mechanism
17 first injection unit
18 second injection unit
19 first mold cavity
20 second mold cavity
21 mold core

The invention claimed is:

1. A multilayer molding apparatus, comprising:
a fixed platen mounted with a mold core;
a moving platen mounted with a dummy plate on its surface facing the mold core, and movable with respect to the fixed platen in a mold opening/closing direction;
a rotary platen provided between the fixed platen and the moving platen, movable with respect to the fixed platen and the moving platen in the mold opening/closing direction, rotatable about an axis extending perpendicular to the mold opening/closing direction, having at least a surface facing the mold core at a first position of rotation and a surface facing the mold core at a second position of rotation, and mounted with a first mold cavity on the surface facing the mold core at the first position of rotation and with a second mold cavity on the surface facing the mold core at the second position of rotation;
a first injection unit provided on the part of the fixed platen connectably to the mold core, and configured to injection-fill a melt resin in a first cavity formed when the mold core and the first mold cavity are clamped against each other;
a second injection unit provided on the part of the fixed platen connectably to the mold core, and configured to injection-fill a melt resin in a second cavity formed when the mold core and the second mold cavity are clamped against each other;
a mold clamping unit configured to move the moving platen with respect to the fixed platen in the mold opening/closing direction;
a rotary platen moving unit configured to move the rotary platen with respect to the fixed platen in the mold opening/closing direction; and
a rotary platen coupling mechanism configured to be capable of coupling and integrating the moving platen and the rotary platen,
wherein the rotary platen and the moving platen are configured to be integrally movable in the mold opening/closing direction by being coupled by the rotary platen coupling mechanism,
wherein the mold clamping unit is a toggle-type mold clamping unit, and
wherein the multilayer molding apparatus is configured to be capable of performing:
a control for, in a state where the moving platen and the rotary platen are coupled by the rotary platen coupling mechanism, integrally moving the rotary platen and the moving platen in the mold opening/closing direction by the toggle-type clamping unit; and a control for, in a state where the moving platen and the rotary platen are not coupled by the rotary platen coupling mechanism, moving the moving platen in the mold opening/closing direction by the toggle-type mold clamping unit, and simultaneously or after moving the moving platen, moving the rotary platen in the mold opening/closing direction by the rotary platen moving unit.

2. The multilayer molding apparatus according to claim 1, wherein the rotary platen and the second injection unit are separate members that are attachable and detachable.

3. A multilayer molding method carried out by using the multilayer molding apparatus according to claim 1, comprising:

a first mold clamping step of clamping the mold core and the first mold cavity to form the first cavity;

a first injection filling step of filling a first material, which is a foamable melt resin, in the first cavity from the first injection unit;

a slight mold opening step of, after the first injection filling step, integrally opening the moving platen and the rotary platen coupled and integrated by the rotary platen coupling mechanism, slightly only a specified quantity, by the toggle-type mold clamping unit, such that the first material filled in the first injection filling step expands in the first cavity to form a first molded component;

a mold opening step of, after the slight mold opening step, releasing coupling between the moving platen and the rotary platen by the rotary platen coupling mechanism, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of after the mold opening step, rotating the rotary platen to make the second mold cavity face the mold core;

a second mold clamping step of, after the rotating step, clamping the mold core and the second mold cavity to form the second cavity; and a second molding step of, after the second mold clamping step, filling a second material, which is a melt resin, in the second cavity from the second injection unit to form a second molded component.

4. A multilayer molding method carried out by using the multilayer molding apparatus according to claim 1, comprising:

a first mold clamping step of clamping the mold core and the first mold cavity to form the first cavity;

a first molding step of filling a first material, which is a melt resin, in the first cavity from the first injection unit to form a first molded component;

a mold opening step of, after the first molding step, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of after the mold opening step, rotating the rotary platen to make the second mold cavity face the mold core;

a second mold clamping step of, after the rotating step, clamping the mold core and the second mold cavity to form the second cavity;

a second injection filling step of filling a second material, which is a foamable melt resin, in the second cavity from the second injection unit; and a slight mold opening step of, after the second injection filling step, integrally opening the moving platen and the rotary platen coupled and integrated by the rotary platen coupling mechanism, slightly only a specified quantity, by the toggle-type mold clamping unit, such that the second material filled in the second injection filling step expands in the second cavity to form a second molded component.

5. A multilayer molding method carried out by using the multilayer molding apparatus according to claim 1, comprising:

a first mold clamping step of clamping the mold core and the first mold cavity to form the first cavity;

a first injection filling step of filling a first material, which is a foamable melt resin, in the first cavity from the first injection unit;

a first slight mold opening step of, after the first injection filling step, integrally opening the moving platen and the rotary platen coupled and integrated by the rotary platen coupling mechanism, slightly only a specified quantity, by the toggle-type mold clamping unit, such that the first material filled in the first injection filling step expands in the first cavity to form a first molded component;

a mold opening step of, after the first slight mold opening step, releasing coupling between the moving platen and the rotary platen by the rotary platen coupling mechanism, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of, after the mold opening step, rotating the rotary platen to make the second mold cavity face the mold core;

a second mold clamping step of, after the rotating step, clamping the mold core and the second mold cavity to form the second cavity;

a second injection filling step of filling a second material, which is a foamable melt resin, in the second cavity from the second injection unit; and a second slight mold opening step of, after the second injection filling step, integrally opening the moving platen and the rotary platen coupled and integrated by the rotary platen coupling mechanism, slightly only a specified quantity, by the toggle-type mold clamping unit, such that the second material filled in the second injection filling step expands in the second cavity to form a second molded component.

6. A multilayer molding method carried out by using the multilayer molding apparatus according to claim 1, comprising:

a mold closing step of closing the moving platen and the rotary platen coupled and integrated by the rotary platen coupling mechanism, to a position at which the mold core and the first mold cavity are slightly gapped from each other only a specified quantity to form the first cavity, by the toggle-type mold clamping unit;

a first injection filling step of, after the mold closing step, filling a first material, which is a melt resin, in the first cavity from the first injection unit;

an injection press step of clamping the mold core and the first mold cavity in conjunction with the first injection filling step or after the first injection filling step to compress the first material in the first cavity to form a first molded component;

a mold opening step of, after the injection press step, releasing coupling between the moving platen and the rotary platen by the rotary platen coupling mechanism, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of, after the mold opening step, rotating the rotary platen to make the second mold cavity face the mold core;

a second mold clamping step of, after the rotating step, clamping the mold core and the second mold cavity to form the second cavity; and a second molding step of, after the second mold clamping step, filling a second material, which is a melt resin, in the second cavity from the second injection unit to form a second molded component.

7. A multilayer molding method carried out by using the multilayer molding apparatus according to claim 1, comprising:

a first mold clamping step of clamping the mold core and the first mold cavity to form the first cavity;

a first molding step of filling a first material, which is a melt resin, in the first cavity from the first injection unit to form a first molded component;

a mold opening step of, after the first molding step, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of, after the mold opening step, rotating the rotary platen to make the second mold cavity face the mold core;

a mold closing step of, after the rotating step, closing the moving platen and the rotary platen coupled and integrated by the rotary platen coupling mechanism, to a position at which the mold core and the second mold cavity are slightly gapped from each other only a specified quantity to form the second cavity, by the toggle-type mold clamping unit;

a second injection filling step of, after the mold closing step, filling a second material, which is a melt resin, in the second cavity from the second injection unit; and an injection press step of clamping the mold core and the second mold cavity in conjunction with the second injection filling step or after the second injection filling step to compress the second material in the second cavity to form a second molded component.

8. A multilayer molding method carried out by using the multilayer molding apparatus according to claim 1, comprising:

a first mold closing step of closing the moving platen and the rotary platen coupled and integrated by the rotary platen coupling mechanism, to a position at which the mold core and the first mold cavity are slightly gapped from each other only a specified quantity to form the first cavity, by the toggle-type mold clamping unit;

a first injection filling step of, after the first mold closing step, filling a first material, which is a melt resin, in the first cavity from the first injection unit;

a first injection press step of clamping the mold core and the first mold cavity in conjunction with the first injection filling step or after the first injection filling step to compress the first material in the first cavity to form a first molded component;

a mold opening step of, after the first injection press step, releasing coupling between the moving platen and the rotary platen by the rotary platen coupling mechanism, moving the moving platen in the mold opening direction by the toggle-type mold clamping unit, and simultaneously or after moving the moving platen, moving the rotary platen in the mold opening direction by the rotary platen moving unit to open the mold core and the first mold cavity in a state where the first molded component is held on the mold core;

a rotating step of, after the mold opening step, rotating the rotary platen to make the second mold cavity face the mold core;

a second mold closing step of, after the rotating step, closing the moving platen and the rotary platen coupled and integrated by the rotary platen coupling mechanism, to a position at which the mold core and the second mold cavity are slightly gapped from each other only a specified quantity to form the second cavity, by the toggle-type mold clamping unit;

a second injection filling step of, after the second mold closing step, filling a second material, which is a melt resin, in the second cavity from the second injection unit; and a second injection press step of clamping the mold core and the second mold cavity in conjunction with the second injection filling step or after the second injection filling step to compress the second material in the second cavity to form a second molded component.

9. A multilayer molding apparatus, comprising;

a fixed platen having a surface mountable with a mold core;

a moving platen having a surface, which faces the surface of the fixed platen mountable with a mold core, mountable with a dummy plate, the moving platen being movable with respect to the fixed platen in a mold opening/closing direction;

a rotary platen provided between the fixed platen and the moving platen, movable with respect to the fixed platen and the moving platen in the mold opening/closing direction, rotatable about an axis extending perpendicular to the mold opening/closing direction, having at least a surface facing the surface of the fixed platen mountable with a mold core at a first position of rotation and a surface facing the surface of the fixed platen mountable with a mold core at a second position of rotation, and mountable with mold cavities on these surfaces respectively;

a first injection unit provided on the part of the fixed platen, and configured to injection-fill a melt resin in a first cavity formed between the surface of the fixed platen mountable with a mold core and the surface of the rotary platen facing the surface of the fixed platen mountable with a mold core at the first position of rotation;

a second injection unit provided on the part of the fixed platen, and configured to injection-fill a melt resin in a second cavity formed between the surface of the fixed platen mountable with a mold core and the surface of the rotary platen facing the surface of the fixed platen mountable with a mold core at the second position of rotation;

a mold clamping unit configured to move the moving platen with respect to the fixed platen in the mold opening/closing direction;

a rotary platen moving unit configured to move the rotary platen with respect to the fixed platen in the mold opening/closing direction; and a rotary platen coupling mechanism configured to be capable of coupling and integrating the moving platen and the rotary platen, wherein the rotary platen and the moving platen are configured to be integrally movable in the mold opening/closing direction by being coupled by the rotary platen coupling mechanism, wherein the mold clamping unit is a toggle-type mold clamping unit, and wherein the multilayer molding apparatus is configured to be capable of performing:

a control for, in a state where the moving platen are coupled by the rotary platen coupling mechanism, integrally moving the rotary platen and the moving platen in the mold opening/closing direction by the toggle-type mold clamping unit; and a control for, in a state where the moving platen and the rotary platen are not coupled by the rotary platen coupling mechanism, moving the moving platen in the mold opening/closing direction by the toggle-type mold clamping unit, and simultaneously or after moving the moving platen, moving the rotary platen in the mold opening/closing direction by the rotary platen moving unit.

* * * * *